Dec. 2, 1941.　　　F. J. LAPOINTE　　　2,264,538
BROACHING MACHINE
Filed May 6, 1940　　　2 Sheets-Sheet 1
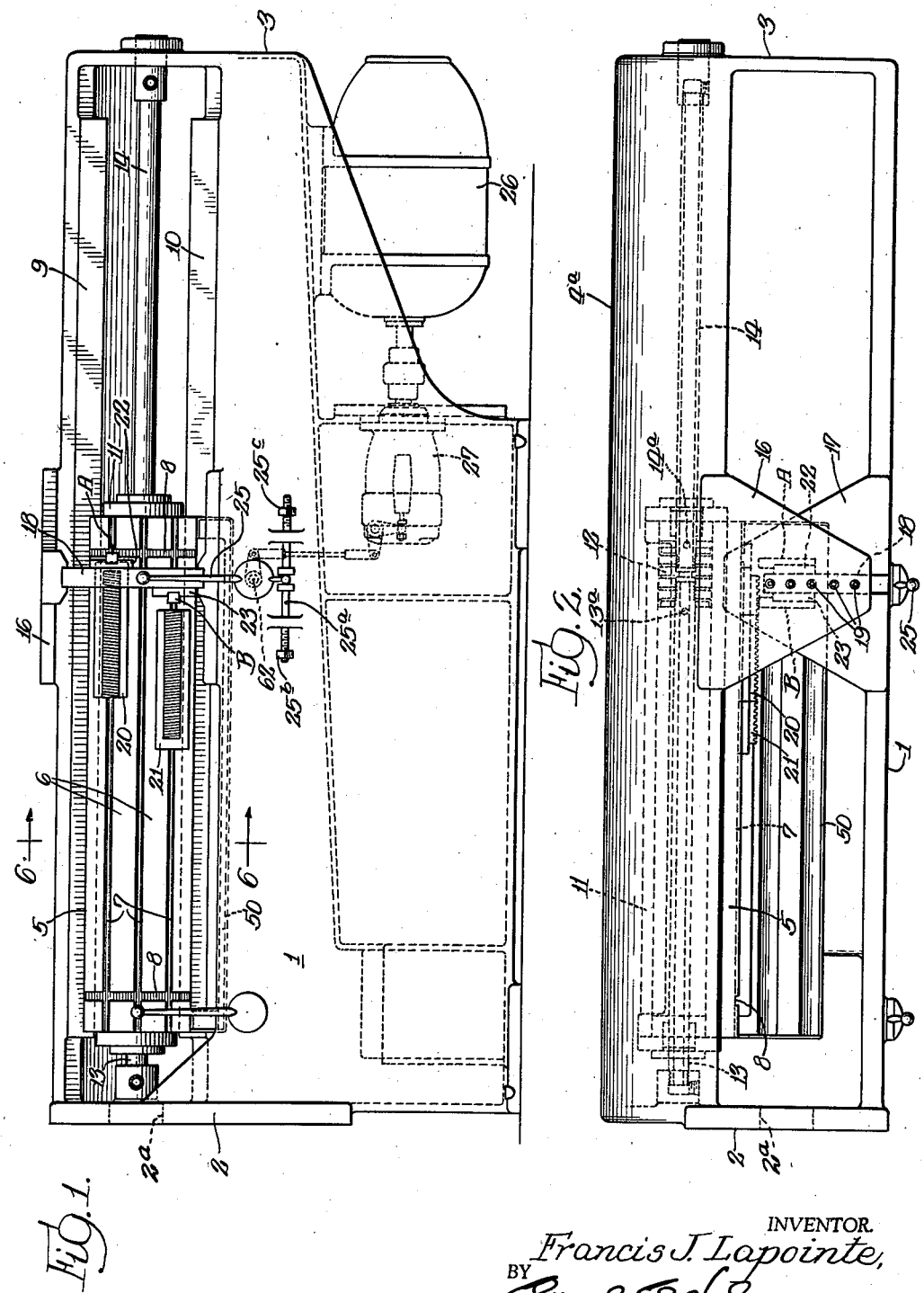
INVENTOR.
Francis J. Lapointe,
BY
ATTORNEY.

Dec. 2, 1941.  F. J. LAPOINTE  2,264,538
BROACHING MACHINE
Filed May 6, 1940  2 Sheets-Sheet 2
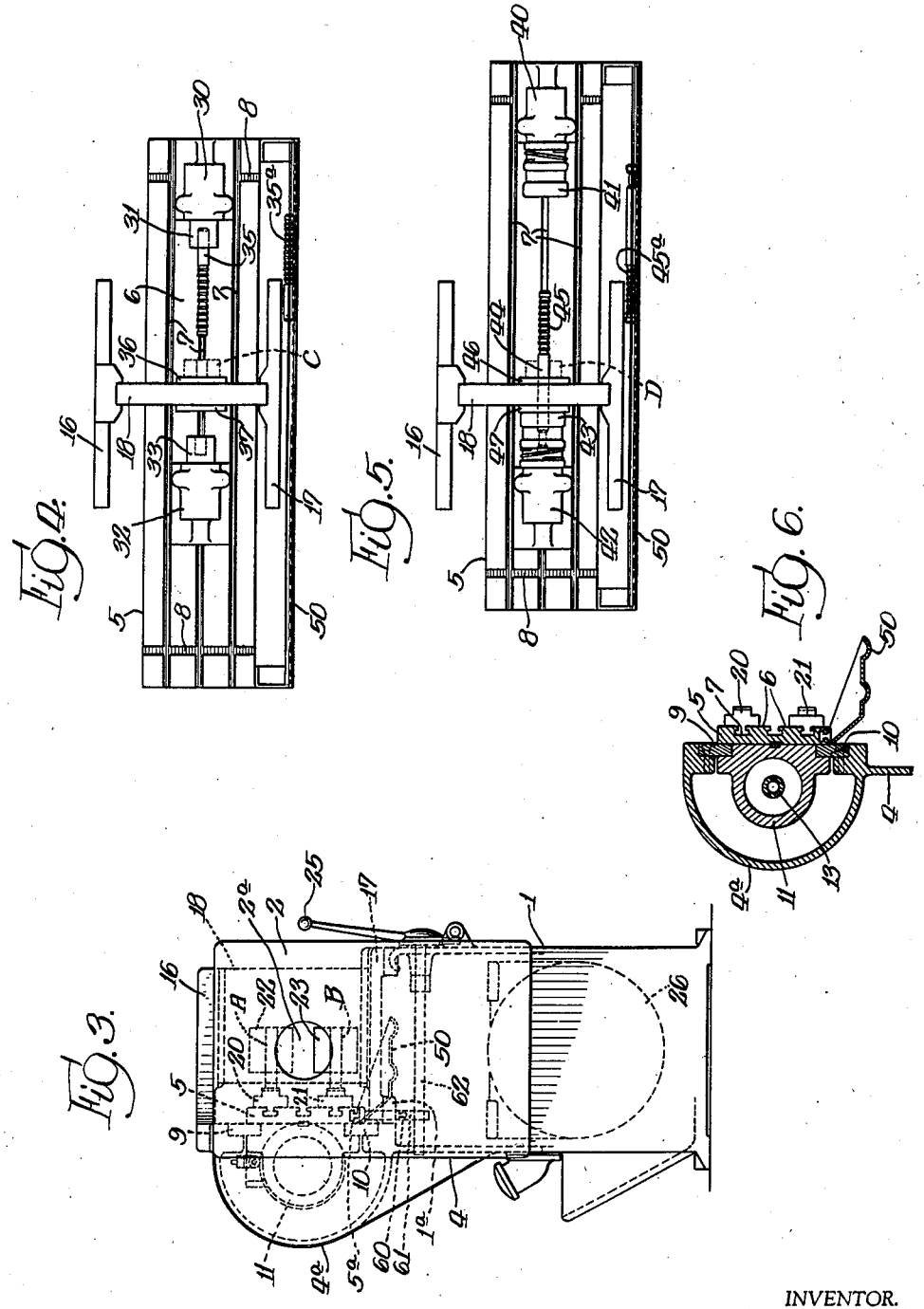
INVENTOR.
Francis J. Lapointe,
BY
ATTORNEY.

Patented Dec. 2, 1941

2,264,538

UNITED STATES PATENT OFFICE 2,264,538

BROACHING MACHINE

Francis J. Lapointe, Ann Arbor, Mich., assignor to American Broach & Machine Co., Ann Arbor, Mich., a corporation of Michigan Application May 6, 1940, Serial No. 333,456

19 Claims. (Cl. 90—33)

My invention relates to broaching machines and especially to a hydraulically actuated universal broaching machine.

A primary object of the invention is the provision of a universal broaching machine capable of performing with equal efficiency all types of broaching operations, such as push broaching, pull broaching, and surface broaching, as well as miscellaneous operations which are at times performed on the certain types of broaching machines.

A more particular object of the invention is to provide a universal broaching machine having the simplicity and accuracy of operation of a single purpose machine but so constructed that it has the numerous advantages of a general purpose machine in that it permits of convenient and rapid set-up, by means of which it can be changed over from one type of broaching operation to another, without the necessity of rebuilding or rearranging the operating parts of the machine, or may even perform a plurality of broaching or other operations at the same time.

Another object is the provision of a new and improved broaching machine of rugged and compact construction having a carriage for supporting broaching tools which is of novel construction and mounting for reciprocation in a manner calculated to produce the most precise results, regardless of the type of broaching for which the machine is set up.

Still another object is the provision of a universal broaching machine having a single moving broach carriage mounted to reciprocate past a work support and constructed to carry broaching tools in positions for performing work strokes respectively during movement of the carriage in opposite directions so that both movements of the carriage may be utilized to secure maximum production from the machine. In this connection it is an object of the invention to provide a work support having a pair of oppositely facing work receiving surfaces in substantially parallel planes so that work pieces of like nature can be handled alternately at opposite sides of the work support for the broaching operations performed alternately in opposite directions by the travel of the carriage.

It is still another object to provide a new and improved all-purpose broaching machine wherein the work is always accommodated at the same relative position on the machine irrespective of the particular type of broaching operation which is being performed, thus making possible a permanent set up so that fixtures, conveyors and other auxiliary conveniences of operation need not be altered or removed when the machine is changed over from one type of broaching operation to another.

A further object is the provision of a new and improved universal broaching machine having a horizontally elongated frame with horizontally extending guideways and a broaching tool carriage mounted for reciprocation thereon, together with a vertically disposed work support positioned at about the middle of the range of travel of the carriage so that movement of the carriage in either direction past the work support may be utilized for performing a broaching operation, and work pieces may be applied with equal convenience to either side of the work support for such operations.

Still a further object is to provide a universal hydraulic broaching machine having a stationary work support and a horizontally disposed piston and cylinder device, the piston of which is stationary and the cylinder of which is horizontally reciprocable past the work support and is guided throughout its length and throughout its movements in ways formed on the machine so as to have an accurate and precise movement, the cylinder having rigidly associated with it a broach carriage formed for the attachment of fixtures in the nature of cross-heads adapted to removably secure push broaches or pull broaches, with such cross-heads arranged to provide for the performance of broaching operations by movement of the carriage in both directions. And it is also an object to provide for the mounting of surface broaches on the carriage and arranged for performing working strokes during movement of the carriage in both directions.

In addition, it is an object of the invention to provide a universal hydraulic broaching machine having a stationary work support with oppositely disposed vertical work receiving faces and with bracing means connecting the support with the frame of the machine but positioned so as to leave the support conveniently and readily accessible for placement and handling of work pieces and tools, the machine including a horizontally reciprocable broach carriage formed for the attachment of push broaches, pull broaches or surface broaches.

A broaching machine constructed in accordance with my invention can be readily adapted for push broaching, pull broaching or surface broaching operations. The cylinder being rigidly connected to the broach supporting carriage, renders the machine unusually well adapted for the performance of surface broaching operations because the rigid backing thus provided for the surface broach permits of extremely precise operation and eliminates inaccuracy which might otherwise be introduced by yielding of the broaching tool and its support. Improved performance is also obtained in the other broaching operations, particularly push broaching, because the rigid nature of the carriage prevents yielding or distortion of the fixture which carries the broach and avoids inaccuracy which sometimes occurs when the cylinder is stationary and the broach is carried by a ram projected from the cylinder. And, finally, with the carriage adapted to have broaches or broach holding fixtures attached to it at various locations in its length or width, it becomes feasible to employ the operating strokes of the carriage in both directions as working strokes to perform broaching operations, either by using two broaches arranged respectively to work in opposite directions, or by transferring one broach from a fixture at one end of the carriage to a fixture at the opposite end so as to work alternately in opposite directions. In either case, this utilizes the movements of the machine to the greatest possible extent, and permits a maximum production. And with the work support stationarily mounted, the construction and design of auxiliary equipment, such as conveyors and the like, for assisting in the handling of the work pieces, will be materially simplified, and such auxiliary equipment may be permanently located.

Further objects and advantages of my invention will become apparent from the following description taken in connection with the accompanying drawings which form a part of this specification.

In the drawings:

Figure 1 is a front elevational view of a broaching machine embodying the features of this invention and showing the carriage set up with a pair of surface broaches.

Figure 2 is a top plan view of the same.

Figure 3 is an end elevational view showing the left-hand end of the machine shown in Figure 1.

Figure 4 is a front elevational detail view showing the carriage of the machine set up for push broaching.

Figure 5 is a front elevational view similar to Figure 4 but showing the carriage set up for pull broaching.

Figure 6 is a detail section taken as indicated at line 6—6 on Figure 1.

While the invention is susceptible of various modifications and alternative constructions, it is here shown and will be described hereinafter in a preferred embodiment, but it is not intended that the invention is thereby to be limited to the specific construction disclosed but it is intended to cover all modifications and alternative constructions falling within the spirit and scope of the invention as defined by the appended claims.

In the drawings, the broaching machine illustrated for purposes of disclosure is of a horizontal type and as shown comprises generally a hollow frame of rectangular outline comprising a front wall 1, end walls 2 and 3, and a back wall 4 which includes an upper portion of arcuate formation at 4a to accommodate the mechanism for driving the broach carriage. This carriage 5 includes a vertically extending front face 6 which is formed with horizontal T-slots 7 and transversely disposed vertical T-slots 8 which provide for the attachment of broaches or broach supporting fixtures, as by means of suitable bolts or clamping devices, in a well understood manner. The frame includes horizontally extending guideways 9 and 10 which extend almost throughout the length of the machine from end to end, and between which the tool carriage 5 is slidably mounted. Preferably, as illustrated, the driving means for the carriage is of the hydraulic type, including a cylinder 11 rigidly connected to the carriage and of substantially the same length, with a piston 12 fixedly secured between hollow piston rods 13 and 14 which are anchored in the end walls 2 and 3 respectively, and which may serve for conducting the motive fluid to the interior of the cylinder, in a well understood manner. The cylinder 11 and its piston 12 are seen in dotted outline in Figures 2 and 3, and need not be described in detail for a proper understanding of the present invention. It will be noted, however, that the rearwardly bulging arcuate formation of the frame at 4a serves to accommodate the cylinder which reciprocates horizontally within the frame under control of the motive fluid supplied through the hollow piston rods 13 and 14. By reason of the rigid connection between the cylinder 12 and the tool carriage 5 the guideways 9 and 10 serve to support and guide the cylinder as well as the tool carriage.

About midway of the length of the machine there extends forwardly from the upper edge of the back wall a rigid bracket 16, and from the upper edge of the front wall 1 there extends rearwardly a rigid bracket 17. A work support in the form of a rectangular tablet 18 is positioned with its upper and lower edges engaged in snugly fitting grooves in the brackets 16 and 17, and the work support is anchored to the brackets by suitable securing screws indicated at 19 in Figure 2. This work support 18 provides a pair of oppositely facing work receiving surfaces in parallel vertical planes extending closely adjacent the tool carriage 5 so that the latter reciprocates past the work support, first in one direction, then in the other, as it is propelled by the driving power of the hydraulic cylinder and piston mechanism. Preferably, the work support is symmetrically located in relation to the range of travel of the tool carriage 5 so that movements of the latter in both directions may be employed as working strokes for performing broaching operations, thus utilizing the travel of the carriage to the fullest possible extent, and securing maximum production from the machine.

Figures 1, 2 and 3 illustrate the machine as set up for surface broaching operations, with a pair of surface broaches 20 and 21 both secured rigidly to the vertical face 6 of the tool carriage 5. Work holding devices 22 and 23 are indicated more or less diagrammatically as mounted on the opposite vertical faces of the work support 18, holding work pieces A and B respectively. It may be understood that, as viewed in Figure 1, the broach 20 has just completed its working stroke on the piece A in the movement of the tool carriage 5 from right to left, and that the broach 21 is ready to perform a cutting operation upon the piece B during the return movement of the carriage 5 from left to right. It will be understood, of course, that the work piece A will be removed from its holder 22 before the return travel of the carriage commences for performing work upon the piece B, and that, similarly, the piece B will not have been placed in active position until completion of the broaching operation upon the piece A. In most cases, the pieces A and B will be identical, and the broaches 20 and 21 will be identical, for performing similar operations so that the active employment of the tool carriage in both directions practically doubles the speed of operation of the machine, since it eliminates an idle return stroke of the carriage. But, if desired, the work pieces A and B may be different, and the broaches 20 and 21 may or may not be different from each other, according to the character of the work performed by them.

The drawings show a control lever 25 located at the middle of the machine adjacent the work support 18, and while no detailed description of the control mechanism is necessary for an understanding of the present invention, it may be understood that the motor, seen at 26, will operate continuously to drive a suitable pump, indicated at 27, for supplying hydraulic fluid under pressure to the power cylinder 11, and that, by shifting the lever 25 to one side of its central position, the operator actuates suitable valve mechanism for causing the cylinder to travel in one direction, or by shifting the lever to the opposite side of its mid-position, the cylinder will be caused to travel in the opposite direction. Preferably, by means of suitable stops or tappets (not shown in detail herein) travel of the cylinder is arrested automatically at the end of its working stroke, and preferably, also, the lever 25 will be returned automatically to its mid-position so that the operator need not give it further attention until he has removed the work piece just operated upon by the machine and inserted another work piece to be operated upon, whereupon he will swing the lever 25 in the proper direction to initiate the next working stroke. It will also be readily understood by those skilled in the art that the automatic stops or tappets may be adjusted to limit the working strokes to something less than the full range of the machine whenever the broaching operations do not require full range strokes, thus eliminating unnecessary waiting time between working movements, and speeding up production.

Figure 4 illustrates the tool carriage 5 as set up for performing a push broaching operation, utilizing the opposite sides of the work support 18 alternately. For this purpose a fixture, in the nature of a cross-head 30, is mounted on the vertical face 6 of the tool carriage 5, and supports a push nose or push head 31, while a similar cross-head 32, having a push head 33, is mounted in spaced relation to the first cross-head, but facing in the opposite direction. A push broach 35 is inserted in the head 31 for operation upon a work piece such as that indicated at C in Figure 4, the work support being fitted with a work holding nest or other fixture 36, and being apertured to permit the passage of the broach 35 as the tool carriage travels from right to left. Upon completion of this stroke the broach 35 is removed from the push head 31, and the work piece C is removed from the machine. Then the same broach 35 may be inserted in the push head 33, facing in the opposite direction, or a second broach 35ª may be fitted into the push head 33, ready for operation upon another work piece to be placed in the nest or work fixture 37 on the opposite face of the work support 18. The use of a second broach 35ª may serve to simplify the handling of a single broach, which would involve reversing it, end for end, for use in the second cross-head, or if the two successive broaching operations are performed upon different work pieces, or upon the same piece successively, and require broaches of different dimensions, then, obviously, a second broach 35ª will be needed. But, in either case, the tool carriage 5 performs a useful working stroke in each direction of its reciprocative movement, so that, in effect, the machine does the work of two single-acting machines.

From the foregoing the application of the same principles to pull broaching operations will be fairly evident, but Figure 5 illustrates the tool carriage 5 as set up for such work. In this case the two cross-heads 40 and 42 are provided with pull heads 41 and 43 respectively, of well understood construction, each adapted to grip the reduced end of the shank 44 of a pull broach 45 which is shown in position preparatory to being drawn through a work piece D secured in a nest 46 or other holder on the right face of the work support 18. When this working stroke has been completed the pull broach 45 is removed from the pull head 43, and the work piece D is removed from the machine. Another work piece, which may or may not be similar to the work piece D, is inserted in the nest or holder 47, and either the broach 45 or a single pull broach 45ª is fitted into the pull head 41 for a working stroke in the opposite direction, that is, as the carriage 5 travels to the right. For convenience, it may be noted that the carriage is fitted with a tool tray 50 which travels with it so as to provide a convenient receptacle for the alternative broach 35ª or 45ª, if they are used, or to receive the other broaches in the process of handling and shifting them from one cross-head to the other, if desired.

The particular arrangement of the brackets 16 and 17 which engage the upper and lower edges of the work support 18, is such that with the bracket 16 projecting forwardly from the upper edge of the rear wall of the machine and the bracket 17 projecting rearwardly from the upper edge of the front wall, the space adjacent the work supporting faces of the member 18 is left clear and unobstructed, and the dimensions of the frame may be such that this space will be at a convenient height for access by the operator in placing and removing the work pieces and in shifting the broaches from one cross-head to the other where this is required by the nature of the work. It also leaves the front face 6 of the tool carriage 5 substantially unobstructed for convenience in mounting and securing surface broaches such as 20 and 21, shown in Figure 1, or the cross-heads for push or pull broaches, as shown in Figures 4 and 5. And the design of the brackets 16 and 17, in the approximately triangular form shown, adapts them to brace the work supporting tablet 18 so that it is very rigidly held in relation to the main frame of the machine and in opposition to the stresses imposed upon it during broaching operations. The lower brace 17 is not only attached to the front wall 1 but, as indicated in dotted outline in Figure 3, its rear or inner end is lodged upon a suitable flange 1ª provided inside the frame, so that the weight of the work support 18 and other parts associated with it, is rigidly upheld without the danger of undue deflection or distortion of the parts in operation of the machine.

As seen in Figure 3, the end wall 2 is formed with an opening 2ª aligned with the position at which a broach may be mounted on the carriage 5, and, as shown, the opposite faces of this end wall 2 are finished to serve as a work support.

This will permit setting up an extra broach on the carriage at the end which is nearer the end wall 2, and usually this can be done without disturbing other broaches mounted to operate in connection with the work support 18. Thus the machine will be prepared to perform additional work at the support 2 when the support 18 is not in use, or, in some instances, it may be feasible to operate simultaneously on work pieces at both supports.

It will be evident that there is a distinct advantage in the arrangement of the machine with its two aligned hollow piston rods 13 and 14 tied to the end walls 2 and 3 and with the cylinder 11 thus adapted equally well for work at any position in its range of movement along the piston rods. It may be understood that the pump, indicated at 27, is of the familiar wobble plate type, in which the flow is readily reversed so as to discharge at either of two outlets, not shown; with these outlets connected by suitable piping to the hollow piston rods 13 and 14 the fluid under pressure may be delivered to either side of the piston 12 by ports 13ᵃ and 14ᵃ respectively, for driving the cylinder and the carriage 5 in one direction or the other. The control lever 25 being linked to the flow-reversing mechanism of the pump 27, is shown in Figure 1 as standing at neutral position at which no pressure is applied to either side of the piston 12, but it may be considered that movement of the lever 25 in one direction will cause such pressure to be applied to one side of the piston while movement of the lever 25 in the opposite direction will apply the pressure at the opposite side of the piston to produce reverse movement of the carriage. A rod 25ᵃ, slidably mounted on the frame of the machine, is interconnected with the lever 25 and is fitted with adjustable stop nuts 25ᵇ and 25ᶜ which may be understood as controlling the extent of movement of the lever in either direction from its neutral position so as to vary the volume employed in accordance with the adjustment of these stops. The working stroke in either direction may be terminated automatically by means of lugs or tappets 60 which may be adjustably clamped at any desired position in a T-slot 5ᵃ extending longitudinally in the lower edge of the carriage 5, it being understood that when the carriage has traveled the desired distance in a given direction, the tappet 60 will engage a suitable rocker 61 fixed on the shaft 62 which carries the control handle 25, and that the final portion of the carriage movement will thus rock the shaft to bring the handle 25 back to neutral position, causing the carriage to come to rest, awaiting further control by the operator. Since the outer ends of the piston rods 13 and 14 are both anchored to the end walls of the frame, the application of pressure against either side of the piston 12 will be resisted by a tension in one or the other of the piston rods, resulting in a similar distribution of stresses, regardless of the direction in which the machine is operated.

I claim as my invention:

1. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and the tool carriage being constructed to carry broaching tools in positions for operating, during movement of the carriage in opposite directions respectively, upon work pieces disposed on said oppositely facing surfaces of the work support.

2. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of broaching tools attached to the tool carriage in positions for operating during successive strokes of the carriage in opposite directions respectively, upon work pieces disposed on said oppositely facing surfaces of the work support.

3. In a broaching tool, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and the tool carriage carrying fixtures each constructed to carry a broaching tool, said fixtures being arranged respectively for supporting tools in position for operating during movement of the carriage in opposite directions and upon work pieces disposed on said oppositely facing surfaces of the work support.

4. In a broaching machine, in combination, a horizontally extending frame having horizontal guideways, a work support on the frame adjacent the guideways and intermediate the ends thereof, a broaching tool carriage mounted on the guideways for reciprocation past the work support, said support having a pair of oppositely facing vertical work receiving surfaces, and the tool carriage being constructed to carry broaching tools in positions for operating upon work pieces disposed on said oppositely facing surfaces of the work support and during alternate strokes of the carriage respectively.

5. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of surface broaches secured to the tool carriage in position for operating respectively upon work pieces disposed on said oppositely facing surfaces of the work support and during movement of the carriage in opposite directions.

6. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of fixtures rigidly secured to the tool carriage each constructed to removably support a broaching tool, one of said fixtures being positioned to hold a tool for cutting movement in one direction and the other fixture being positioned to hold a tool in position for cutting movement in the opposite direction, whereby the machine is adapted to perform working strokes during movement of the carriage in both directions.

7. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of fixtures rigidly secured to the tool carriage each constructed to removably support a push broach, one of said fixtures being positioned to hold a broach for cutting movement in one direction and the other fixture being positioned to hold a broach in position for cutting movement in the opposite direction, whereby the machine is adapted to perform working strokes during movement of the carriage in both directions.

8. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of fixtures rigidly secured to the tool carriage each constructed to releasably support a pull broach, one of said fixtures being positioned to hold a broach for cutting movement in one direction and the other fixture being positioned to hold a broach in position for cutting movement in the opposite direction, whereby the machine is adapted to perform working strokes during movement of the carriage in both directions.

9. In a broaching machine, in combination, a horizontally extending frame having horizontal guideways, a work support on the frame adjacent the guideways and intermediate the ends thereof, a broaching tool carriage mounted on the guideways for reciprocation past the work support, said support having a pair of oppositely facing vertical work receiving surfaces, said frame extending upwardly behind the tool carriage and including a bracket extending forwardly over the work support and engaged therewith, the front of the frame terminating below the lower edge of the work support and including a bracket extending rearwardly in engagement with said lower edge, whereby the work receiving surfaces of said support are left readily accessible from the front of the machine.

10. In a broaching machine, in combination, a horizontally extending frame having horizontal guideways, a work support on the frame adjacent the guideways and intermediate the ends thereof, a broaching tool carriage mounted on the guideways for reciprocation past the work support, said support having a pair of oppositely facing vertical work receiving surfaces, the tool carriage including a vertically extending bed plate constructed to carry broaching tools and tool holding fixtures at a plurality of positions in its area, said frame extending upwardly behind the tool carriage and the front portion of the frame terminating below the level of the tool carriage, said frame including horizontally extending brackets supported by the rear and front portions of the frame above and below the work support to hold the latter, whereby the forward vertically extending face of the tool carriage is left accessible from the front of the machine for mounting or adjustment of broaching tools thereon.

11. In a broaching machine, in combination, a horizontally extending frame having horizontal guideways, a work support on the frame adjacent the guideways and intermediate the ends thereof, a broaching tool carriage mounted on the guideways for reciprocation past the work support, said support having a pair of oppositely facing vertical work receiving surfaces, said frame extending upwardly behind the tool carriage and including a bracket extending forwardly over the work support, the front of the frame terminating below the lower edge of the work support and including a bracket extending rearwardly under the same, said brackets having horizontal grooves opening toward each other and aligned to engage the upper and lower edges respectively of the work support, and said work support being removably held in said grooves of the brackets.

12. In a broaching machine, in combination, a horizontally extending frame having horizontal guideways, a work support on the frame adjacent the guideways and intermediate the ends thereof, a broaching tool carriage and a horizontally disposed hydraulic cylinder rigidly associated with said carriage, said cylinder and tool carriage being mounted for reciprocation together on said guideways past the work support, and a piston in the cylinder fixedly mounted by connection to the frame, said support having oppositely facing vertical work receiving surfaces, and the tool carriage being constructed to carry broaching tools in positions for operating upon work pieces disposed on said oppositely facing surfaces of the work support and during alternate strokes of the carriage respectively.

13. In a broaching machine, in combination, a horizontally extending frame having horizontal guideways, a work support on the frame adjacent the guideways and intermediate the ends thereof, a broaching tool carriage and a horizontally disposed hydraulic cylinder rigidly associated with said carriage, said cylinder and tool carriage being mounted for reciprocation together on said guideways past the work support, and a piston in the cylinder fixedly mounted by connection to the frame, said tool carriage including a vertically extending bed plate constructed to carry broaching tools and tool holding fixtures at a plurality of positions in its area, said frame extending upwardly behind the tool carriage and the front portion of the frame terminating at a lower level, said frame including horizontally extending brackets supported by the rear and front portions of the frame respectively and engaging the upper and lower edges of the work support to hold the latter with its work receiving surfaces substantially perpendicular to the bed plate of the tool carriage, said bed plate being constructed to carry broaching tools in positions for operating upon work pieces disposed on said oppositely facing surfaces of the work support and during alternate strokes of the carriage respectively.

14. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of surface broaches rigidly attached to the tool carriage in parallel locations with their cutting teeth oppositely disposed for performing working strokes during movement of the carriage in opposite directions respectively, upon separate work pieces disposed on said oppositely facing surfaces of the work support.

15. In a broaching machine, in combination, a frame having longitudinally extending guideways, a work support on the frame adjacent the guideways and intermediate the ends thereof, a broaching tool carriage mounted on the guideways for reciprocation past the work support, said support having a pair of oppositely facing work receiving surfaces, and a pair of similar fixtures rigidly secured to the tool carriage each having a receiving socket to removably support a broaching tool, said fixtures being mounted on the carriage with their sockets in axial alignment and opening toward each other for supporting broaches therein constructed to perform their cutting operations respectively during movement of the carriage in opposite directions.

16. In a broaching machine, in combination, a frame having longitudinally extending guideways, a work support on the frame adjacent the guideways intermediate the ends thereof, a broaching tool carriage mounted on the guideways for reciprocation past the work support, said support having a pair of oppositely facing work receiving surfaces and the tool carriage being constructed to carry broaching tools in positions for operating, during movement of the carriage in opposite directions respectively, upon work-pieces disposed on said oppositely facing surfaces of the work support, said frame including an end wall extending in a plane perpendicular to the direction of movement of the carriage and formed to serve as an addditional work support in cooperation with a broaching tool mounted on the carriage.

17. In a broaching machine, in combination, a frame having longitudinally extending guideways, a work support on the frame adjacent the guideways and intermediate the ends thereof, a broaching tool carriage mounted on the guideways for reciprocation past the work support, and said frame including an end wall extending in a plane perpendicular to the direction of movement of the carriage and having an opening in alignment with the position at which a broaching tool may be mounted on the carriage, whereby said end wall is adapted to serve as an additional work support.

18. In a broaching machine, in combination, a horizontally extending frame having horizontal guideways and a work support on the frame adjacent the guideways and intermediate the ends thereof, a broaching tool carriage and a horizontally disposed hydraulic cylinder rigidly connected to said carriage, said cylinder and tool carriage being mounted for reciprocation together on said guideways past the work support, said support having oppositely facing vertical work receiving surfaces and the tool carriage being constructed to carry broaching tools in positions for operating upon work pieces disposed on said oppositely facing surfaces of the work support and during alternate strokes of the carriage respectively, a piston in the cylinder with a pair of piston rods extending from the piston in opposite directions respectively with their outer ends fixed to the frame, and means for supplying fluid under pressure to the cylinder at either side of the piston at will.

19. In a broaching machine, in combination, a horizontally extending frame having horizontal guideways and a work support on the frame adjacent the guideways and intermediate the ends thereof, a broaching tool carriage and a horizontally disposed hydraulic cylinder rigidly connected to said carriage, said cylinder and tool carriage being mounted for reciprocation together on said guideways past the work support, said support having oppositely facing vertical work receiving surfaces and the tool carriage being constructed to carry broaching tools in positions for operating upon work pieces disposed on said oppositely facing surfaces of the work support and during alternate strokes of the carriage respectively, a piston in the cylinder with a pair of hollow piston rods, each of said rods having a port adjacent the piston, and means for supplying fluid under pressure to either of said hollow piston rods at will and thence to the cylinder for driving the cylinder and tool carriage in the chosen direction along the guideways.

FRANCIS J. LAPOINTE.